(12) United States Patent
Fehse et al.

(10) Patent No.: US 9,269,270 B2
(45) Date of Patent: Feb. 23, 2016

(54) DEVICE AND METHOD FOR SUPPORTING A DRIVER OF A MOTOR VEHICLE DURING A DRIVING MANEUVER

(75) Inventors: Meike Fehse, Ditzingen (DE); Marcus Schneider, Ludwigsburg (DE); Jochen Staack, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 951 days.

(21) Appl. No.: 13/247,068

(22) Filed: Sep. 28, 2011

(65) Prior Publication Data

US 2012/0089294 A1 Apr. 12, 2012

(30) Foreign Application Priority Data

Oct. 6, 2010 (DE) .......................... 10 2010 042 048

(51) Int. Cl.
| | |
|---|---|
| *B60W 30/095* | (2012.01) |
| *B60W 30/06* | (2006.01) |
| *B60W 50/12* | (2012.01) |
| *G08G 1/16* | (2006.01) |
| *B62D 1/28* | (2006.01) |
| *B62D 15/02* | (2006.01) |

(52) U.S. Cl.
CPC ............. *G08G 1/168* (2013.01); *B60W 30/06* (2013.01); *B60W 30/0956* (2013.01); *B60W 50/12* (2013.01); *B62D 1/286* (2013.01); *B62D 15/0285* (2013.01); *B60W 2520/14* (2013.01); *B60W 2540/10* (2013.01); *B60W 2540/18* (2013.01); *B60W 2550/10* (2013.01)

(58) Field of Classification Search
USPC .......................................................... 701/25
See application file for complete search history.

(56) References Cited

U.S. PATENT DOCUMENTS

| | | | | |
|---|---|---|---|---|
| 6,059,063 A | * | 5/2000 | Shimizu et al. ............... | 180/204 |
| 6,170,591 B1 | * | 1/2001 | Sakai et al. .................... | 180/204 |

(Continued)

FOREIGN PATENT DOCUMENTS

| | | |
|---|---|---|
| DE | 10 2005 017359 | 11/2005 |
| DE | 102005017359 | * 11/2005 |

(Continued)

OTHER PUBLICATIONS

Search Report dated Mar. 3, 2014 of German Patent Application No. 10 2010 042 048.4 dated Oct. 6, 2010.

(Continued)

*Primary Examiner* — Shelley Chen
(74) *Attorney, Agent, or Firm* — Kenyon & Kenyon LLP

(57) ABSTRACT

A method and device for supporting a driver of a motor vehicle during a driving maneuver during which longitudinal guidance and/or lateral guidance is/are performed in an automated manner. A trajectory for performing the driving maneuver being determined and the vehicle being guided with automatic control along the trajectory, while the surroundings of the vehicle is being monitored during the driving maneuver. If the driver intervenes in the steering while lateral guidance is being performed or if the driver operates the accelerator while longitudinal guidance is being performed or if the driver intervenes in the steering or operates the accelerator while longitudinal guidance and lateral guidance are being performed, the control of the vehicle is returned to the driver. In the case of an imminent endangerment to the surroundings, control is not transferred to the driver.

10 Claims, 2 Drawing Sheets

(56) References Cited

U.S. PATENT DOCUMENTS

| | | | |
|---|---|---|---|
| 6,571,176 B1 * | 5/2003 | Shinmura et al. | 701/301 |
| 6,587,752 B1 * | 7/2003 | Saito | 700/264 |
| 2005/0131645 A1 * | 6/2005 | Panopoulos | 701/214 |
| 2006/0235590 A1 | 10/2006 | Bolourchi et al. | |
| 2011/0082623 A1 * | 4/2011 | Lu et al. | 701/41 |

FOREIGN PATENT DOCUMENTS

| | | | | |
|---|---|---|---|---|
| DE | 102005 004394 | | 8/2006 | |
| DE | 102006 000301 | | 1/2007 | |
| DE | 102006000301 | * | 1/2007 | |
| DE | 10 2009 010 006 | | 10/2009 | |
| DE | 102008 040077 | | 1/2010 | |
| DE | 102008040077 | * | 1/2010 | G08G 1/16 |
| DE | 102010 037639 | | 4/2011 | |
| EP | 0 835 797 | | 4/1998 | |
| EP | 1 864 881 | | 12/2007 | |

OTHER PUBLICATIONS

Search Report dated Jan. 16, 2012 of UK Patent Application No. GB 2484404 dated Oct. 5, 2011.

* cited by examiner

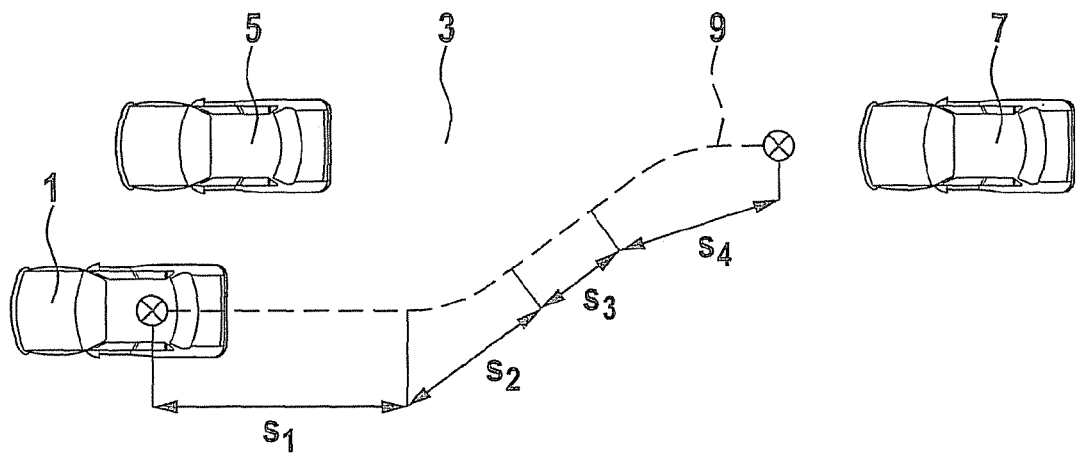
Fig. 1.1
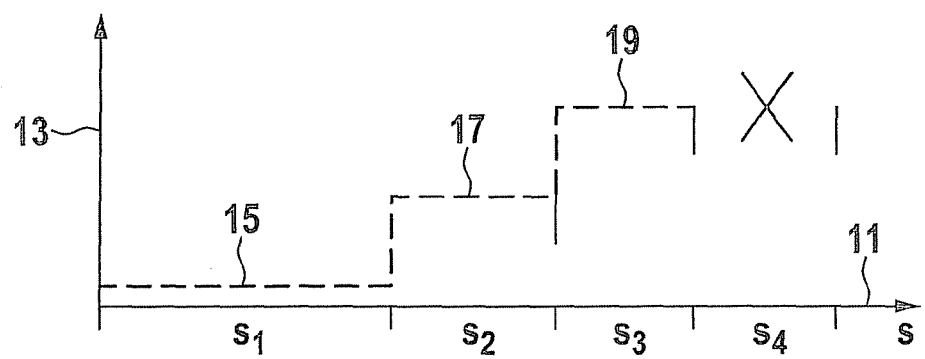
Fig. 1.2

DEVICE AND METHOD FOR SUPPORTING A DRIVER OF A MOTOR VEHICLE DURING A DRIVING MANEUVER

RELATED APPLICATION INFORMATION

The present application claims priority to and the benefit of German patent application no. 10 2010 042 048.4, which was filed in Germany on Oct. 6, 2010, the disclosure of which is incorporated herein by reference.

FIELD OF THE INVENTION

The present invention is directed to a method for supporting a driver of a motor vehicle during a driving maneuver. Moreover, the present invention relates to a device for implementing a method.

BACKGROUND INFORMATION

Methods for supporting a driver of a motor vehicle during a driving maneuver are, for example, methods that support the driver during a parking operation. In the case of currently known methods, the location and orientation of a parking space relative to the vehicle are determined when driving past a parking space via distance sensors attached to the side of the vehicle. A suitable trajectory along which the vehicle may be moved into the parking space is then calculated. At the start of the parking operation, a control unit activates the vehicle steering in such a way that the steering wheel turns as the vehicle moves without operation by the driver to guide the vehicle into the parking space. The control unit thus takes over the lateral guidance of the vehicle. During the parking operation, the driver is responsible for operating the accelerator, the brake and the clutch, if applicable, to brake or accelerate the vehicle as needed. This means that the driver is responsible for the longitudinal guidance of the vehicle.

In addition to such semi-automatic systems, fully automatic systems in which the longitudinal guidance of the vehicle is also taken over by a control unit are known. A differentiation is made between systems in which the driver is not supposed to operate any pedals and the speed is regulated without action by the driver. Operation of a pedal by the driver is interpreted as the driver's intent to regain control.

Also known are methods in which the driver still operates the pedals but the maximum achievable speed during the parking operation is continuously decreased as a function of the position so that the speed of 0 is achieved upon reaching the boundaries of the parking space. In this case, the driver may continuously operate the accelerator to indicate to the system that he is still in control while the vehicle automatically slows until it automatically stops upon reaching the boundary of the parking space.

Methods for semi-autonomous or autonomous driving of a motor vehicle, as may be used for parking in a parking space, are discussed in DE A 10 2009 010 006, for example. It is also known that the system may be overridden by actions of the driver so that control is returned to the driver as a result of the override.

However, a disadvantage of the known methods is, for example, that operation of the accelerator by the driver may result in excessive acceleration of the vehicle, possibly causing a collision with an object bordering the parking space, depending on the orientation of the vehicle. To prevent this, it is known, for example, that the brake pedal must be operated before the driver may perform the longitudinal guidance. By requiring operation of the brake pedal, it is ensured that the driver's foot is not on the accelerator during the control transfer, thus preventing abrupt acceleration. However, if quick acceleration is required, for example in the case of a lateral approach of a vehicle, the driver will first attempt to operate the accelerator to accelerate the vehicle before remembering that the brake must first be operated to allow vehicle acceleration. This behavior is generally found to be unnatural or unacceptable.

SUMMARY OF THE INVENTION

In the method according to the present invention for supporting a driver of a motor vehicle during a driving maneuver, longitudinal guidance and/or lateral guidance of the vehicle is/are performed in an automated manner during the driving maneuver. At least one trajectory for performing the driving maneuver is determined and the vehicle is guided along the at least one trajectory via automatic control, the vehicle surroundings being monitored during the driving maneuver. If the driver intervenes in the steering while lateral guidance is being performed in an automated manner or if the driver operates the accelerator while longitudinal guidance is being performed in an automated manner or if the driver intervenes in the steering or operates the accelerator while longitudinal guidance and lateral guidance are being performed in an automated manner, vehicle control is returned to the driver if the driving path resulting from the operation of the steering wheel or the accelerator does not result in an endangerment to the vehicle surroundings and control is not returned to the driver in the event of an imminent endangerment to the surroundings.

The method according to the present invention is suitable for driving maneuvers in which the longitudinal guidance is performed automatically and for those in which longitudinal guidance and lateral guidance are performed automatically. The method is particularly suitable for driving maneuvers in which longitudinal guidance and lateral guidance are performed in an automated manner. If longitudinal guidance and lateral guidance are performed in an automated manner, control is transferred to the driver either in the case of a vehicle steering intervention by the driver or operation of the accelerator by the driver.

A device according to the present invention for implementing the method includes an arrangement for calculating at least one trajectory for performing the driving maneuver and for automatically controlling the vehicle along the at least one trajectory, an arrangement for monitoring the vehicle surroundings during the driving maneuver, and an arrangement for checking whether a driving path resulting from operation of the steering wheel or the accelerator results in an endangerment to the vehicle surroundings, to return vehicle control to the driver if a driving path resulting from the operation of the steering wheel or the accelerator does not result in an endangerment to the vehicle surroundings and to not return control to the driver in the event of an imminent endangerment to the vehicle surroundings.

As a result of the method according to the present invention in which control is only returned to the driver if there is no endangerment to the surroundings, a collision with an object in the vehicle surroundings, for example, is prevented when sudden acceleration occurs, for example, upon operation of the accelerator. Therefore, it is not necessary for the driver to initially operate the brake pedal before operating the accelerator to quickly accelerate the vehicle to remove it from a possible danger area. Direct operation of the accelerator to remove the vehicle from the danger area is sufficient.

In a specific embodiment of the method according to the present invention, angle ranges for steering within which continuing travel without endangerment to the surroundings is possible are predefined at the start of the driving maneuver for each route segment. By predefining the angle ranges, it is immediately clear for every route segment whether a steering angle predefined by the driver during vehicle acceleration and thus continued travel in the predefined direction would result in an endangerment to the surroundings.

Within the scope of the exemplary embodiments and/or exemplary methods of the present invention, an endangerment to the surroundings of the vehicle refers to a possible collision with objects in the vehicle surroundings in particular. Such collisions are able to be prevented by the method according to the present invention.

Route segments are individual sections of the trajectory. These sections include sections in which the vehicle is traveling straight, sections of a curve with a constant steering angle, and sections of a travel direction change due to a steering angle change, the steering angle change typically occurring with a constant change speed. The individual route segments are thus straight lines, curves, or clothoids. The trajectory is composed of individual route sections that follow one another in immediate succession. The trajectory is generally the path which is covered by the center of the rear axle of the vehicle. However, in addition to the path of the center of the rear axle, any other point may also be used to calculate the trajectory. Therefore, the center of the front axle, a corner of the vehicle, or the center of the vehicle may be used to determine the trajectory. However, the trajectory is typically the path covered by the center of the rear axle.

The vehicle surroundings are detected during the driving maneuver via an arrangement as already currently used for detecting vehicle surroundings, for example, in parking assistance systems. In general, these include distance sensors with which the distance of objects from the vehicle and the direction of objects are detected. Suitable distance sensors are, for example, ultrasound sensors, radar sensors, infrared sensors, and/or LIDAR sensors. The use of optical sensors, e.g. stereo cameras, is also possible. Ultrasound sensors or radar sensors are typically used.

To detect the surroundings of the vehicle, at least one sensor has a suitable processor or the sensors are connected to a suitable control unit. The data recorded by the sensors are evaluated in the processor and a map of the surroundings is created from the corresponding data. The length and orientation of the parking space with respect to the vehicle, for example, may be determined from the map of the surroundings so that a suitable trajectory may be calculated. The trajectory may also be calculated in the control unit. To evaluate the data recorded by the sensors and to determine the trajectory, a parking assistance control unit as already used in parking assistance systems allowing semi-automatic parking may be used, for example. Since only the lateral guidance of the vehicle is taken over in the case of a semi-automatically parking vehicle and the driver is responsible for the longitudinal guidance, the steering of the vehicle may be transferred at any time to the driver by appropriate operation of the steering wheel by the driver without sudden acceleration occurring. As a result, it is sufficient to furnish the control unit with a low safety classification, for example QM or ASIL-A according to ISO 26262 (WD) as used, for example, in ultrasound parking assistance systems.

Complicated and costly security measures as used for semi-automatically parking vehicles are not necessary for a parking assistance control unit.

To be able to use the known parking assistance control unit for the method according to the present invention, it is advantageous when a first control unit is used for determining the trajectories for the driving maneuver and determining the angle ranges and a second control unit is used to check whether it is possible to transfer control to the driver without endangerment to the surroundings. The first control unit for determining the trajectories for the driving maneuver and for determining the angle ranges may be the parking assistance control unit. The second control unit, which checks whether it is possible to transfer control to the driver without endangerment to the surroundings, is a control unit for an electronic stability program (ESP), for example. The control unit for the electronic stability program directly activates the brakes of the vehicle. In addition, the ESP control unit has a high safety level (ASIL-D according to ISO 26262 (WD)).

To check whether there is an endangerment to the surroundings in the case of transfer of the control to the driver, it is possible for information to be transmitted from the first control unit to the second control unit, e.g., the ESP control unit. The information is in particular the angle ranges within which continuing travel without endangerment to the surroundings is possible. If an error is detected in the first control unit, the angle ranges determined by the first control unit are not used for checking whether it is possible to transfer control to the driver without endangerment to the surroundings. In this case the information of the first control unit is discarded. An error in the first control unit is assumed, for example, when the communication between the first control unit and the second control unit is interrupted, when there is communication interference, e.g., as detected on the basis of a checksum, or when the first control unit only sends sporadic information to the second control unit.

In an alternative specific embodiment of the present invention, the angle of rotation of the vehicle relative to the angle of the vehicle at the start of the driving maneuver is determined using a yaw rate sensor and a check is performed on the basis of the angle of rotation to determine whether it is possible to transfer control to the driver without endangerment to the surroundings. The angle of rotation of the vehicle relative to the starting angle at the beginning of the parking operation may be determined, for example, using temporal integration independently of the first control unit. The direction in which the vehicle would move in the case of operation of the accelerator is detected on the basis of the angle of rotation of the vehicle so that it may be detected here in connection with the detected vehicle surroundings whether there is an imminent endangerment or safe driving is possible.

In addition, it is possible for a trajectory that is set during transfer of control to be determined using steering angle information of the second control unit. The trajectory which the vehicle would follow may then be compared to the surroundings data of the vehicle to ensure that an endangerment to the surroundings is ruled out when the control is transferred to the driver.

When the driver, for example, turns the steering wheel of the motor vehicle in such a way that the vehicle curves away from the parking space or the measured angle of rotation is approximately the same as the starting angle, i.e., the vehicle is still moving in a straight line, it may be assumed that continuing travel will not result in a collision. In this case, control over the longitudinal guidance is returned to the driver without the brake first needing to be operated. Once a check shows that there is no risk of collision, the control is returned to the driver as soon as the driver operates the accelerator. Acceleration is permitted.

To prevent the vehicle from accelerating abruptly, it is advantageous when the maximum torque is limited during transfer of control to the driver while the driver is operating the accelerator. For example, the torque may be limited to 25% of the maximum torque. As a result of the limitation, the vehicle is initially accelerated slowly and faster acceleration is performed after the limitation is lifted. Comfortable acceleration without a "jump" is thus possible.

Therefore, the method according to the present invention has the advantage that the driver may take over guidance of the vehicle during a driving maneuver and may quickly maneuver the vehicle out of a danger area, for example, without the necessity for non-intuitive behavior as is the case, for example, when the brake needs to be operated before control is transferred. The method according to the present invention also allows a faster response to a dangerous situation, thus increasing safety.

By using two control units, in particular the ESP control unit, for deciding whether longitudinal guidance may be transferred to the driver, no increased and thus costly additional security is needed for the first control unit, e.g., a parking assistance control unit. The parking assistance control unit for longitudinal and lateral guidance may thus continue to be based on a standard control unit as already currently used for automatic or semi-automatic parking operations.

Exemplary embodiments of the present invention are represented in the drawing and are explained in greater detail in the following description.

BRIEF DESCRIPTION OF THE DRAWINGS

FIG. 1.1 shows a breakdown of a parking trajectory into individual route segments.

FIG. 1.2 shows steering angle sections for the individual route segments from FIG. 1.1.

Figure 2:
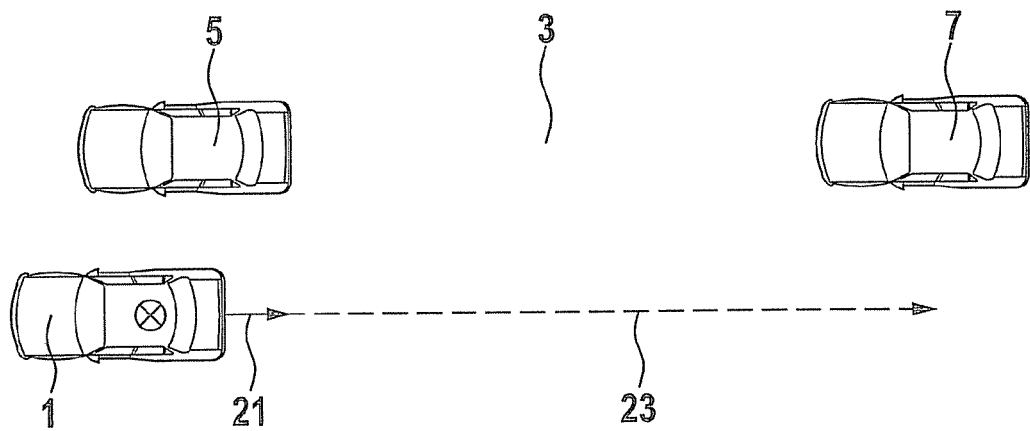
FIG. 2 shows the takeover of control during travel in a straight line.

A trajectory that is broken down into individual route segments is shown in FIG. 1.1.

DETAILED DESCRIPTION

A driving maneuver that may be performed using the method according to the present invention is, for example, a parking maneuver of a vehicle 1 into a parking space 3. In the specific embodiment shown here, parking space 3 is a longitudinal parking space that is parallel to vehicle 1. The longitudinal expansion of parking space 3 is delimited by a front vehicle 5 and a rear vehicle 7. A lateral boundary of parking space 3 may be a curb, a wall, or another vehicle, for example. In addition to front vehicle 5 and rear vehicle 7, the parking space may also be delimited by any other object, e.g. planters, posts, walls, or the like.

In the specific embodiment shown in FIG. 1.1, parking space 3 is dimensioned in such a way that vehicle 1 may be moved into parking space 3 in a single backward movement. For this purpose, the vehicle is moved along a trajectory 9 into parking space 3. In the case of an automatic parking system, parking space 3 is initially measured as vehicle 1 passes using suitable sensors, for example, ultrasound sensors, radar sensors, infrared sensors, LIDAR sensors, or optical sensors, with regard to expansion and orientation with respect to vehicle 1. A map of the surroundings of parking space 3 is generated from the thus acquired measurement data, and trajectory 9 along which vehicle 1 may move into the parking space is calculated. The vehicle is automatically moved along trajectory 9 into parking space 3 in a next step. The control of the vehicle with respect to longitudinal guidance and lateral guidance is typically taken over by a suitable control system, e.g., a parking assistance control unit. Commands are sent by the control unit to a control motor for steering that sets the steering wheel and thus the orientation of the vehicle in such a way that the vehicle is guided along the trajectory. In addition, commands are sent to the engine, transmission, and brakes of the vehicle to take over the longitudinal guidance. For this purpose, it is advantageous, for example, when the speed of the vehicle is decreased as vehicle 1 approaches the rear boundary formed by rear vehicle 7 in this case. When the end point of trajectory 9 is reached and thus after vehicle 1 has been moved into parking space 3, vehicle 1 is brought to a standstill.

In the specific embodiment shown here, trajectory 9 is broken down into four route segments. Vehicle 1 moves straight backward along a first route segment $s_1$. The vehicle follows a curve in the direction of parking space 3 along a second route segment $s_2$. Second route segment $s_2$ is followed by a third route segment $s_3$. In third route segment $s_3$ the vehicle drives straight backward again. With a final curve in a fourth route segment $s_4$, vehicle 1 is aligned in the direction of parking space 3.

FIG. 1.2 shows the minimum steering wheel angle for each of route segments $s_1$, $s_2$, $s_3$, $s_4$ at which acceleration of the vehicle is still possible without endangerment to the surroundings and thus transfer of control to the driver is possible.

In the graphs shown in FIG. 1.2, the route along the trajectory is plotted on x-axis 11. The minimum steering wheel angle at which a transfer of control to the driver without endangerment to the surroundings is possible is plotted on y-axis 13.

Vehicle 1 continues to move straight backward along a first route segment $s_1$. The minimum steering wheel angle is thus 0 degrees. In the case of a steering wheel angle greater than 0 degrees, the vehicle is moved away from parking space 3. In contrast, in the case of a steering wheel angle of less than 0 degrees, the vehicle is moved directly into the parking space so that endangerment to the surroundings is possible.

To accelerate the vehicle in the area of second route segment $s_2$ without endangerment to the surroundings, another angle must be set. Minimum second steering wheel angle 17 required for route segment $s_2$ is thus greater than first steering wheel angle 15 during travel straight backward. As soon as the vehicle is in second route segment $s_2$, the vehicle must be moved out of the parking space. This also applies while the vehicle moves along third route segment $s_3$. Since the vehicle is moved deeper into parking space 3 as soon as it reaches third route segment $S_3$, third steering wheel angle 19 must be greater than second steering wheel angle 17. When the vehicle reaches fourth route section $s_4$, it is no longer possible to exit parking space 3.

Vehicle 1 is accelerated in the travel direction of vehicle 1, i.e., backward in the example shown here. To move the vehicle forward, the driver would operate the brakes to stop the vehicle and to engage an appropriate gear so that control may be safely transferred to the driver. Only in the case of acceleration of the vehicle in the same direction in which vehicle 1 is already traveling must a check be performed to determine whether safe acceleration is possible.

According to the exemplary embodiments and/or exemplary methods of the present invention, minimum steering wheel angles 15, 17, 19 may be ascertained by a first control unit, for example a parking assistance control unit. Thus ascertained minimum steering wheel angles 15, 17, 19 are then transferred to a second control unit, for example, a control unit of an electronic stability program (ESP). If communication problems prevail between the first control unit and the second control unit or it is detected that the first control unit is malfunctioning, steering wheel angles 15, 17, 19 ascertained by the first control unit are not taken into consideration to check whether it is possible to transfer control to the driver without endangerment to the surroundings of vehicle 1.

In addition to the minimum steering wheel angles, it is also possible to use information from a yaw rate sensor as used, for example, for the electronic control program. Angles of rotation of vehicle 1 relative to the starting angle at the beginning of the parking operation are determined by the yaw rate sensor, for example by lateral integration. A check is performed on the basis of the thus ascertained angle of rotation of vehicle 1 whether collision-free travel is possible.

Minimum steering wheel angles 15, 17, 19 or the information that there is no more steering wheel angle and thus a transfer of control to the driver is not possible is stored, for example, in a table with allocations to the particular route segments. These data may then be transferred to the second control unit.

FIG. 2 shows an example of a possible acceleration of the vehicle while the vehicle is moving straight backward.

At the start of a parking operation, the vehicle is moving straight backward. The travel direction of the vehicle is indicated by arrow 21. When the driver operates the steering wheel of the vehicle, the automatic steering operation is aborted. The second control unit is used to check whether endangerment to the surroundings, e.g., due to collision with a boundary of parking space 3, is possible while maintaining travel direction 23. Since the vehicle is still moving straight backward, there is no endangerment to the surroundings in the exemplary embodiment shown in FIG. 2 so that a transfer to the driver is possible without the driver initially needing to briefly operate the brake.

Figure 3:
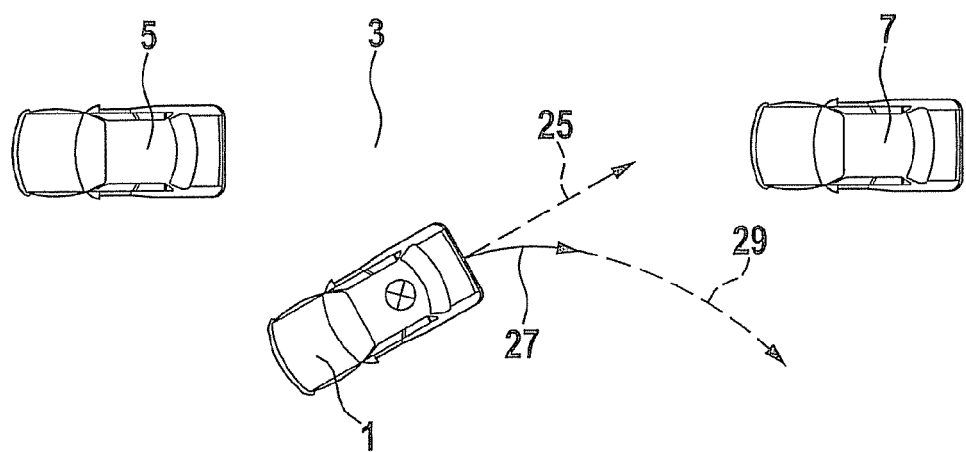
FIG. 3 shows a steering angle setting at which transfer of control to the driver is possible and at which control is not transferred to the driver.

Two possible situations during the parking operation are shown in FIG. 3. Vehicle 1 has already moved in the direction of parking space 3. When vehicle 1 is traveling straight as shown by arrow 25, acceleration would result in a collision with rear vehicle 7 forming the rear boundary of parking space 3. Therefore, control is not transferred to the driver in the case of operation of the accelerator that would result in acceleration of the vehicle. The vehicle is guided further along the calculated trajectory. To obtain control, it is necessary in this case for the driver to operate the vehicle brake. By operating the brake, the speed of the vehicle is reduced to a standstill, if necessary. In the case of transfer of control in a stopped vehicle, the driver has options to perform a driving maneuver, even exiting the parking space. However, a collision with rear vehicle 7 bordering the parking space due to an abrupt acceleration is prevented.

In addition to acceleration by traveling straight 25, it is also possible for the driver of vehicle 1 to operate the steering wheel and to set a steering wheel angle that is greater than the predefined minimum steering wheel angle. When the vehicle is traveling along a route 27 resulting from the set steering wheel angle, vehicle 1 travels along a curve on which a collision with rear vehicle 7 forming the rear boundary of parking space 3 does not occur. When the driver sets the appropriate steering wheel angle and accelerates the vehicle, control may be transferred to the vehicle since endangerment to the surroundings may be ruled out. In the case of acceleration, the vehicle then travels along trajectory 29.

In addition to the operation into a longitudinal parking space shown here, the method according to the present invention may also be used for any other driving maneuvers, for example, during parking maneuvers into lateral parking spaces, during forward parking maneuvers, or during driving maneuvers, for example, when maneuvering in narrow roads or lanes.

What is claimed is:

1. A method for supporting a driver of a motor vehicle during a driving maneuver, during which at least one of longitudinal guidance and lateral guidance is performed in an automated manner, the method comprising:
   determining at least one trajectory for performing the driving maneuver;
   guiding the vehicle via automatic control along the at least one trajectory;
   monitoring the surroundings of the vehicle during the driving maneuver to generate surroundings data; and
   when the driver intervenes in the steering while the lateral guidance is being performed in an automated manner or when the driver operates the accelerator while longitudinal guidance is being performed in an automated manner or when the driver intervenes in the steering or when the driver operates the accelerator when longitudinal guidance and lateral guidance are being performed in an automated manner, determining whether a driving path resulting from operation of the steering wheel or the accelerator would result in an endangerment to the surrounding of the vehicle based on the surroundings data, wherein control of the vehicle is transferred to the driver when a driving path resulting from operation of the steering wheel or the accelerator does not result in an endangerment to the surroundings of the vehicle and control is not transferred to the driver in the case of an imminent endangerment to the surroundings.

2. The method of claim 1, wherein for every route segment, angle ranges for steering are predefined at the start of the driving maneuver within which continuing travel without endangerment to the surroundings is possible.

3. The method of claim 1, wherein a first control unit is used for determining the at least one trajectory for the driving maneuver and for determining the angle ranges, and wherein a second control unit is used to check whether it is possible to transfer control to the driver without endangerment to the surroundings.

4. The method of claim 3, wherein in the case of an error in the first control unit, the angle ranges determined by the first control unit are not used to check whether it is possible to transfer control to the driver without endangerment to the surroundings.

5. The method of claim 1, wherein the angle of rotation of the vehicle relative to the angle of the vehicle at the start of the driving maneuver is determined using a yaw rate sensor, and wherein a check is performed based on the angle of rotation as to whether it is possible to transfer control to the driver without endangerment to the surroundings.

6. The method of claim 1, wherein a trajectory, which is set during control transfer, is determined using steering angle information from the second control unit.

7. The method of claim 1, wherein in the case of operation of the accelerator by the driver, the maximum torque is limited during the transfer of control to the driver to prevent abrupt acceleration.

8. A device for supporting a driver of a motor vehicle during a driving maneuver, during which at least one of longitudinal guidance and lateral guidance is performed in an automated manner, comprising:

a calculating arrangement for calculating the at least one trajectory for performing the driving maneuver and for automatically controlling the vehicle along the at least one trajectory;

a monitoring arrangement for monitoring the surroundings of the vehicle during the driving maneuver and generating surroundings data; and a checking arrangement for checking whether a driving path resulting from operation of the steering wheel or the accelerator results in an endangerment to the vehicle surroundings based on the surroundings data, so as to return control of the vehicle to the driver if a driving path resulting from the operating of the steering wheel or the accelerator does not result in an endangerment to the surroundings of the vehicle and so as to not return control to the driver in the event of an imminent endangerment to the surroundings.

9. The device of claim 8, wherein the calculating arrangement for calculating necessary trajectories includes a first control unit, and the checking arrangement for checking whether it is possible to transfer control to the driver without endangerment to the surroundings includes a second control unit.

10. The device of claim 9, wherein the second control unit is a control unit of an electronic stability program.

\* \* \* \* \*